United States Patent
Roh

(10) Patent No.: US 10,070,139 B2
(45) Date of Patent: Sep. 4, 2018

(54) MULTIMEDIA CODEC, APPLICATION PROCESSOR INCLUDING THE SAME, AND METHOD OF OPERATING THE APPLICATION PROCESSOR

(71) Applicant: Sung Ho Roh, Seoul (KR)

(72) Inventor: Sung Ho Roh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 121 days.

(21) Appl. No.: 15/018,001

(22) Filed: Feb. 8, 2016

(65) Prior Publication Data

US 2016/0255349 A1    Sep. 1, 2016

(30) Foreign Application Priority Data

Feb. 27, 2015    (KR) .................. 10-2015-0028566

(51) Int. Cl.
| | | |
|---|---|---|
| G06K 9/36 | (2006.01) | |
| H04N 19/172 | (2014.01) | |
| H04N 19/107 | (2014.01) | |
| H04N 19/16 | (2014.01) | |

(52) U.S. Cl.
CPC ......... *H04N 19/172* (2014.11); *H04N 19/107* (2014.11); *H04N 19/16* (2014.11)

(58) Field of Classification Search
CPC ..... H04N 19/107; H04N 19/16; H04N 19/172
See application file for complete search history.

(56) References Cited

U.S. PATENT DOCUMENTS

| | | | |
|---|---|---|---|
| 5,212,549 A | 5/1993 | Ng et al. | |
| 5,933,534 A * | 8/1999 | Yoshimoto | H04N 9/8042 375/E7.094 |
| 7,453,941 B1 * | 11/2008 | Yamori | H04N 19/105 375/240.15 |
| 8,451,890 B2 | 5/2013 | Lim et al. | |
| 8,520,730 B2 | 8/2013 | Kadono | |
| 8,687,691 B1 | 4/2014 | Michelsen et al. | |
| 2002/0172282 A1 * | 11/2002 | Kato | H04N 19/107 375/240.13 |
| 2004/0120398 A1 * | 6/2004 | Zhang | H04N 19/147 375/240.03 |
| 2005/0013497 A1 * | 1/2005 | Hsu | H04N 19/52 382/239 |
| 2006/0170786 A1 | 8/2006 | Won | |
| 2008/0101473 A1 * | 5/2008 | Tanaka | H04N 19/56 375/240.16 |

(Continued)

FOREIGN PATENT DOCUMENTS

| | | |
|---|---|---|
| JP | 11041609 | 2/1999 |
| JP | 2012217106 A | 11/2012 |
| JP | 2013168809 A | 8/2013 |

*Primary Examiner* — Li Liu
(74) *Attorney, Agent, or Firm* — Harness, Dickey & Pierce, P.L.C.

(57) ABSTRACT

In one example embodiment, a multimedia codec includes a reader configured to read a first frame in an image group according to a field mode indicated by a mode selection signal, and produce a top field and a bottom field for the first frame. The multimedia codec further includes an encoding component configured to encode the top field in an intra mode and encode the bottom field in an inter mode.

17 Claims, 11 Drawing Sheets

(56) References Cited

U.S. PATENT DOCUMENTS

| | | | |
|---|---|---|---|
| 2009/0060045 A1* | 3/2009 | Tateno | H04N 19/176 |
| | | | 375/240.16 |
| 2009/0262803 A1* | 10/2009 | Wang | H04N 19/105 |
| | | | 375/240.12 |
| 2013/0343453 A1 | 12/2013 | Kitahara et al. | |
| 2014/0009642 A1 | 1/2014 | Jeong | |
| 2014/0119431 A1* | 5/2014 | Chihara | H04N 19/56 |
| | | | 375/240.02 |
| 2016/0094860 A1* | 3/2016 | Minezawa | H04N 19/16 |
| | | | 375/240.12 |

* cited by examiner

1

MULTIMEDIA CODEC, APPLICATION PROCESSOR INCLUDING THE SAME, AND METHOD OF OPERATING THE APPLICATION PROCESSOR

CROSS-REFERENCE TO RELATED APPLICATIONS

This application claims priority under 35 U.S.C. § 119(a) from Korean Patent Application No. 10-2015-0028566 filed on Feb. 27, 2015, the disclosure of which is hereby incorporated by reference in its entirety.

BACKGROUND

Example embodiments of the inventive concepts relate to a multimedia codec, and more particularly, to a multimedia codec for efficiently encoding a still image, an application processor including the same, and a method of operating the application processor.

International standardization of video coding has been led by a Moving Picture Experts Group (MPEG) under International Organization for Standardization/International Electro-technical Commission (ISO/IEC) and a Video Coding Experts Group (VCEG) under International Telecommunications Union Telecommunication Standardization sector (ITU-T). MPEG and VCEG organized a Joint Video Team (JVT) and completed the international video coding standard, i.e., H.264/Advanced Video Coding (AVC). Unlike existing video codecs such as MPEG-2, MPEG-4, H.261, and H.263; H.264/ACV has introduced variable block size motion estimation, ¼-pixel motion vector resolution, multiple reference picture motion estimation, and so on, thereby providing excellent compression capability as compared to existing codecs.

Many recently developed smartphones have a continuous shooting function and display continuously-shot still images at desired (and/or alternatively predetermined) intervals for a user when the user selects continuous shooting. The still images need to be temporarily stored until the user selects one of the still images that have been displayed. When the still images are temporarily stored, a smartphone may use a JPEG image compression method using only intra-frame compression. However, the size of an image compressed using the JPEG image compression method is large, which in turn increases the cost of memory.

In order to overcome this problem, intra-frame compression may be used for an initial still image and inter-frame compression may be used for the subsequent still images. Such image compression method increases a compression rate as compared to the JPEG image compression method but makes it difficult to perform a random access with respect to a particular frame among the still images.

SUMMARY

In one example embodiment, a multimedia codec includes a reader configured to read a first frame in an image group according to a field mode indicated by a mode selection signal, and produce a top field and a bottom field for the first frame. The multimedia codec further includes an encoding component configured to encode the top field in an intra mode and encode the bottom field in an inter mode.

In yet another example embodiment, the multimedia codec further includes a decoding component configured to decode the first frame by decoding the top field in the intra mode, and decoding the bottom field in the inter mode.

In yet another example embodiment, the encoding component is configured to encode a plurality of frames of the image group, the plurality of frames including the first frame, and the decoding component is configured to decode one of the plurality of encoded frames, the one of the plurality of encoded frames corresponding to a frame of the image group selected to be displayed.

In yet another example embodiment, the encoding component is an H.264 encoder, and the decoding component is an H.264 decoder.

In yet another example embodiment, the top field is a group of pixels in odd-numbered rows in the first frame and the bottom field is a group of pixels in even-numbered rows in the first frame.

In yet another example embodiment, the image group including at least two continuous frames is generated in a burst shot mode.

In yet another example embodiment, an encoder comprising the reader and the encoding component operates in one of the field mode and a frame mode according to the mode selection signal.

In one example embodiment, an application processor includes a memory configured to store an image group including at least two frames, a central processing unit (CPU) configured to generate a mode selection signal for determining an encoding mode in which the image group is to be encoded and a multimedia codec configured to encode the image group according to a field mode indicated by the generated mode selection signal. The multimedia codec includes a reader configured to read each of the at least two frames according to the field mode to produce a top field and a bottom field, and an encoding component configured to encode the top field in an intra mode and encode the bottom field in an inter mode.

In yet another example embodiment, the multimedia codec further includes a decoding component configured to decode a frame selected by a user from among the at least two frames.

In yet another example embodiment, the decoding component is configured to decode the selected frame by decoding the top field of the selected frame according to the intra mode and the bottom field of the selected frame according to the inter mode.

In yet another example embodiment, an encoder including the reader and the encoding component is an H.264 encoder and the decoder is an H.264 decoder.

In yet another example embodiment, the top field is a group of pixels in odd-numbered rows in each of the at least two frames and the bottom field is a group of pixels in even-numbered rows in each of the at least two frames.

In yet another example embodiment, the at least two frames of the image group are continuous frames generated in a burst shot mode.

In yet another example embodiment, the encoding mode comprises the field mode and a frame mode.

In one example embodiment, the method of operating an application processor includes storing an image group including at least two frames in a memory and reading each of the at least two frames according to a field mode indicated by a mode selection signal. The method further includes producing a top field and a bottom field for each of the at least two frames, and encoding the top field in an intra mode and the bottom field in an inter mode.

In yet another example embodiment, the method further includes decoding a frame selected by a user from among the encoded at least two frames.

In yet another example embodiment, the decoding decodes the selected frame by decoding the top field of the selected frame according to the intra mode and the bottom field of the selected frame according to the inter mode.

In yet another example embodiment, the encoding and the decoding are performed via an H.264 encoder and an H.264 decoder, respectively.

In yet another example embodiment, the top field is a group of pixels in odd-numbered rows in each of the at least two frames and the bottom field is a group of pixels in even-numbered rows in each of the at least two frames.

In yet another example embodiment, the at least two frames of the image group are continuous frames generated in a burst shot mode.

In yet another example embodiment, the encoding is performed in one of the field mode and a frame mode according to the mode selection signal.

In one example embodiment, a device includes a memory having computer-readable instructions stored therein and a processor. The processor is configured to execute the computer-readable instructions to partition at least one selected image frame selected from a plurality of image frames into a first group and a second group, upon receiving a mode selection signal, encode the first group according to an intra mode of encoding, and encode the second group according to an inter mode of encoding.

In yet another example embodiment, the mode selection signal is a field mode selection signal, and the processor is configured to execute the computer readable instructions to read the selected image frame according to the field mode selection signal in order to partition the selected image frame into the first group and the second group.

In yet another example embodiment, the first group is a top field including pixels corresponding to odd-numbered rows of the selected image frame, and the second group is a bottom field including pixels corresponding to even-numbered rows of the selected image frame.

In yet another example embodiment, the processor is further configured to execute the computer-readable instructions to select the intra mode of encoding from among a plurality of intra encoding schemes.

In yet another example embodiment, the processor is further configured to execute the computer-readable instructions to determine a cost function associated with each of the plurality of intra encoding schemes, and select as the intra mode of encoding, one of the plurality of infra encoding schemes with a lowest cost function among the determined cost functions.

In yet another example embodiment, the process further configured to execute the computer-readable instructions to select the inter mode of encoding from among a plurality of inter encoding schemes.

In yet another example embodiment, the processor is further configured to execute the computer-readable instructions to determine a cost function associated with each of the plurality of inter encoding schemes, and select as the inter mode of encoding, one of the plurality of inter encoding schemes with a lowest cost function among the determined cost functions.

In yet another example embodiment, the processor is further configured to execute the computer-readable instructions to receive a request for displaying one of the plurality of image frames and decode the requested one of the plurality of image frames by decoding the encoded first group of the requested one of the plurality of image frames according to an intra mode of decoding, the intra mode of decoding corresponding to the intra mode of encoding, and decoding the encoded second group of the requested one of the plurality of image frames according to an inter mode of decoding, the inter mode of decoding corresponding to the inter mode of encoding.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF EXAMPLE EMBODIMENTS

Figure 1:
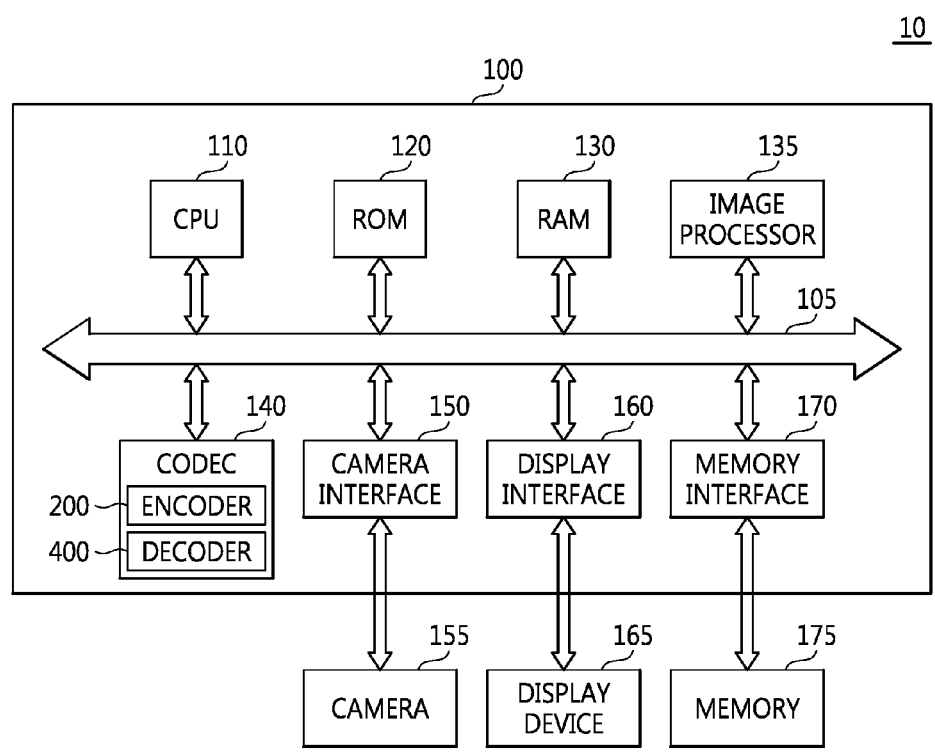
FIG. 1 is a block diagram of a data processing system, according to an example embodiment.

The inventive concepts now will be described more fully hereinafter with reference to the accompanying drawings, in which example embodiments of the invention are shown. This invention may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Throughout example embodiments described hereinafter, terms such as "codec", "encoder", "decoder", "encoding unit", "decoding unit", "encoding component", "decoding component", etc., refer to physical/hardware structures and/or special purpose processors configured to carry out respective functionalities by executing a set of computer readable instructions.

FIG. 1 is a block diagram of a data processing system, according to an example embodiment. The data processing system 10 may be implemented as a mobile terminal such as a smartphone, a tablet personal computer (PC), a personal digital assistant (PDA), an enterprise digital assistant (EDA), a mobile internet device (MID), a video camcorder, or an e-book. The data processing system 10 may include an application processor 100, a camera 155, a display device 165, and a memory 175.

The application processor 100 may include a central processing unit (CPU) 110, a read-only memory (ROM) 120, a random access memory (RAM) 130, an image processor 135, a codec 140, a camera interface 150, a display interface 160, and a memory interface 170. The application processor 100 may be implemented as a system on chip (SoC). The elements 110, 120, 130, 135, 140, 150, 160, and 170 of the application processor 100 may communicate data with one another through a bus 105.

The CPU 110 may control the overall operation of the application processor 100. For instance, the CPU 110 may process or execute computer program(s) (or computer readable instructions) stored as data in the ROM 120 and/or the RAM 130. The execution of the computer program(s) by the CPU 110 transforms the CPU 110 into a special purpose processor for carrying out the functionalities described below.

The CPU 110 may be a single computing component, i.e., a multi-core processor with two or more independent actual processors (or cores).

The ROM 120 may store permanent programs and/or data. The ROM 120 may be implemented as erasable programmable ROM (EPROM) or electrically erasable programmable ROM (EEPROM).

The RAM 130 may temporarily store programs, data, and/or instructions. The RAM 130 may be implemented as dynamic RAM (DRAM) or static RAM (SRAM). The RAM 130 may temporarily store data input/output through the interfaces 150, 160, and 170 or data generated by the codec 140 or the CPU 110.

The image processor 135 may perform image processing on data received from the RAM 130, the camera interface 150, or the memory interface 170 and may output the processed data to the RAM 130, the display interface 160, or the memory interface 170.

The codec (or multimedia codec) 140 may encode and/or decode data stored in the memory 120 or 130, data received from the camera 155, or data output to the display device 165. The codec 140 may include an encoder 200 and a decoder 400. The encoder 200 and the decoder 400 may be an H.264 encoder and an H.264 decoder which comply with the H.264 standard.

Although the codec 140 is formed outside the CPU 110, the camera interface 150, and/or the display interface 160 in the embodiments illustrated in FIG. 1, the codec 140 may be included in the CPU 110, the camera interface 150, and/or the display interface 160. It will not be construed that the scope of the inventive concepts is limited by the disposition of the codec 140. The codec 140 may be a set of computer-readable instructions executable by the CPU 110 to perform the encoding and/or decoding, as will be described below. Furthermore, the codec 140 may be formed in hardware, or a combination of hardware and software.

The camera interface 150 may interface data (e.g., image data) input from the camera 155 in the outside of the application processor 100. The camera 155 may generate data corresponding to an image taken using a plurality of photosensitive elements.

The display interface 160 may interface data (e.g., image data) output to the display device 165 in the outside of the application processor 100. The display device 165 may output image or video data using a liquid crystal display (LCD) or an active matrix organic light emitting diode (AMOLED) display.

The memory interface 170 may interface data received from the memory 175 in the outside of the application processor 100 or data output to the memory 175. The memory 175 may be formed of non-volatile memory such as flash memory or resistive memory.

Figure 2:
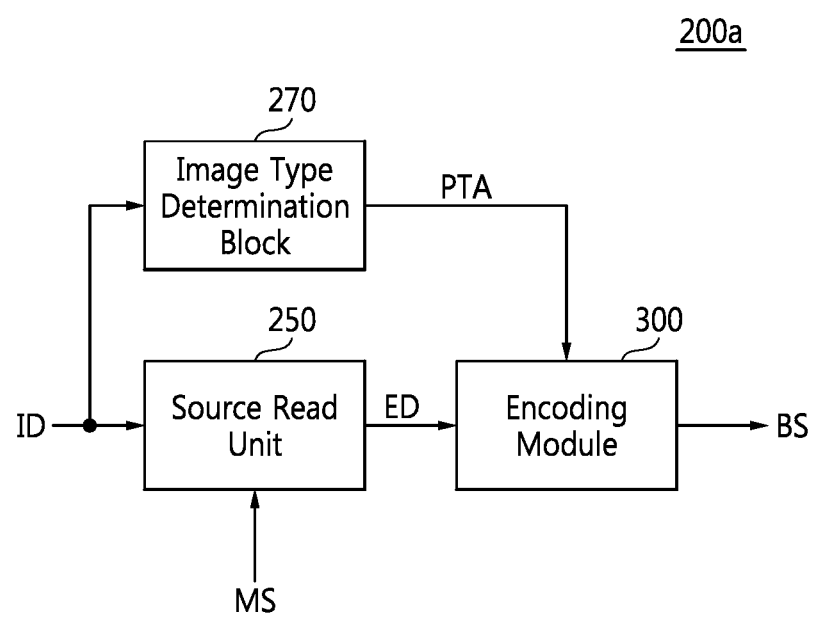
FIG. 2 is a block diagram of an encoder of the codec illustrated in FIG. 1, according to an example embodiment.

FIG. 2, is a block diagram of an encoder of the codec illustrated in FIG. 1, according to an example embodiment. Referring to FIGS. 1 and 2, an example embodiment of the encoder 200 of FIG. 1, shown as encoder 200a in FIG. 2, may include a source read unit 250, an image type determination block 270, and an encoding module 300. While example embodiments below are described as being performed by individual components of the encoder 200a, in one example embodiment the CPU 110 may execute computer-readable instructions to perform the functionalities of the individual components of the encoder 200a.

The source read unit 250 may read image data ID from the RAM 130 according to the control of the CPU 110. In other words, the CPU 110 may control the source read unit 250 to read data temporarily stored in the RAM 130, so that the data is encoded. The source read unit 250 may read the image data ID according to an encoding mode determined by a mode selection signal MS generated by the CPU 110.

The encoding mode may include a frame mode and a field mode. The frame mode is a mode in which data stored in the RAM 130 is read and encoded frame by frame. The field mode is a mode in which data stored in the RAM 130 is read and encoded field by field. Here, a field includes a top field and a bottom field. The top field is a group of pixels in odd-numbered rows in a frame and the bottom field is a group of pixels in even-numbered rows in the frame.

In one example embodiment, when it is assumed that the RAM 130 temporarily stores first through n-th frames (where "n" is an integer of at least 2) generated by the camera 155, the source read unit 250 sequentially reads the first through n-th frames in the frame mode. In the field mode, the source read unit 250 sequentially reads the first through n-th frames field by field. For instance, the source read unit 250 reads the top field of the first frame, and then reads the bottom field of the first frame. Thereafter, the source read unit 250 reads the top field of the second frame, and then reads the bottom field of the second frame. The same may be repeated for the remaining number of frames.

A user may be allowed to use various shooting modes provided by a camera application run by the CPU 110. The shooting modes may largely be divided into a photo shooting mode and a video shooting mode. The photo shooting mode includes a normal mode in which a single frame is taken every time a user presses down a shoot button and a burst shot mode in which a desired (and/or alternatively, predetermined) number of frames are continuously taken once the user presses down the shoot button.

When the user selects the photo shooting mode using the camera application and presses down the shoot button, at least one still image is captured by the camera 155. The captured still image is temporarily stored in the RAM 130 and then transmitted to the codec 140 according to the control of the CPU 110 to be encoded. When at least one still image is captured in the photo shooting mode, the CPU 110 may transmit the mode selection signal MS indicating that the encoding mode is the field mode to the source read unit 250.

Hereinafter, it is assumed that a still image group of continuous frames (i.e., the first through n-th frames) generated when a user takes a picture in the burst shot mode is temporarily stored in the RAM 130 in the example embodiments of the inventive concepts, for convenience' sake in the description.

The source read unit 250 may read the top field and the bottom field of each of the first through n-th frames in response to the mode selection signal MS indicating the field mode. Top fields and bottom fields included in the image data each may be referred to as a field image. The source read unit 250 may output, as encoding data ED, the fields of the first through n-th frames in the order in which the fields have been read.

The image type determination block 270 may receive the image data ID and may determine an image type of each field image in the image data ID. The image type is a kind of image according to which each frame is encoded in a different manner by the encoding module 300. The image type may be divided into an intra (I) image, a predicted (P) image, or a bidirectional (B) image.

The I-image is a type referring to the fact that coding is performed using only intra prediction within a current image without involving any other images. The P-image is a type referring to the fact that coding is performed using both inter prediction referring to a preceding image and intra prediction. The B-image is a type referring to the fact that coding is performed using inter prediction referring to a preceding image and a succeeding image and intra prediction.

The image type determination block 270 assigns the image data ID to a particular image group in order to determine the image type of each field image. The size of the image group is determined by the assignment of an I-image and the structure of the image group is determined by the arrangement of a P-image and/or a B-image. In other words, the number of bits in data coded can be reduced by the arrangement of a P-image and a B-image and the size of the image group is restricted by intermittently assigning an I-image, so that error propagation is prevented.

In the example embodiments of the inventive concepts described hereinafter, it is assumed that when the image data ID is input field by field in the field mode, the image type determination block 270 assigns the image data ID to an image group having a structure of an IP method. The IP method is determining continuous field images of the image data ID as I-images and P-images. However, the inventive concepts are not restricted to the current example embodiments and an IPPP method or an IBBBP method may be used in other embodiments.

The image type determination block 270 may generate an image type assignment signal PTA indicating an image type of a field image in the encoding image ED input to the encoding module 300 and transmit the image type assignment signal PTA to the encoding module 300. The image type determination block 270 may assign the top field of each of the first through n-th frames to an I-image and the bottom field thereof to a P-image.

The encoding module 300 may perform intra prediction and/or inter prediction based on the image type assignment signal PTA according to the image type of the encoding data ED to generate an encoded bitstream BS. The structure and operations of the encoding module 300 will be described in detail with reference to FIG. 3.

Figure 3:
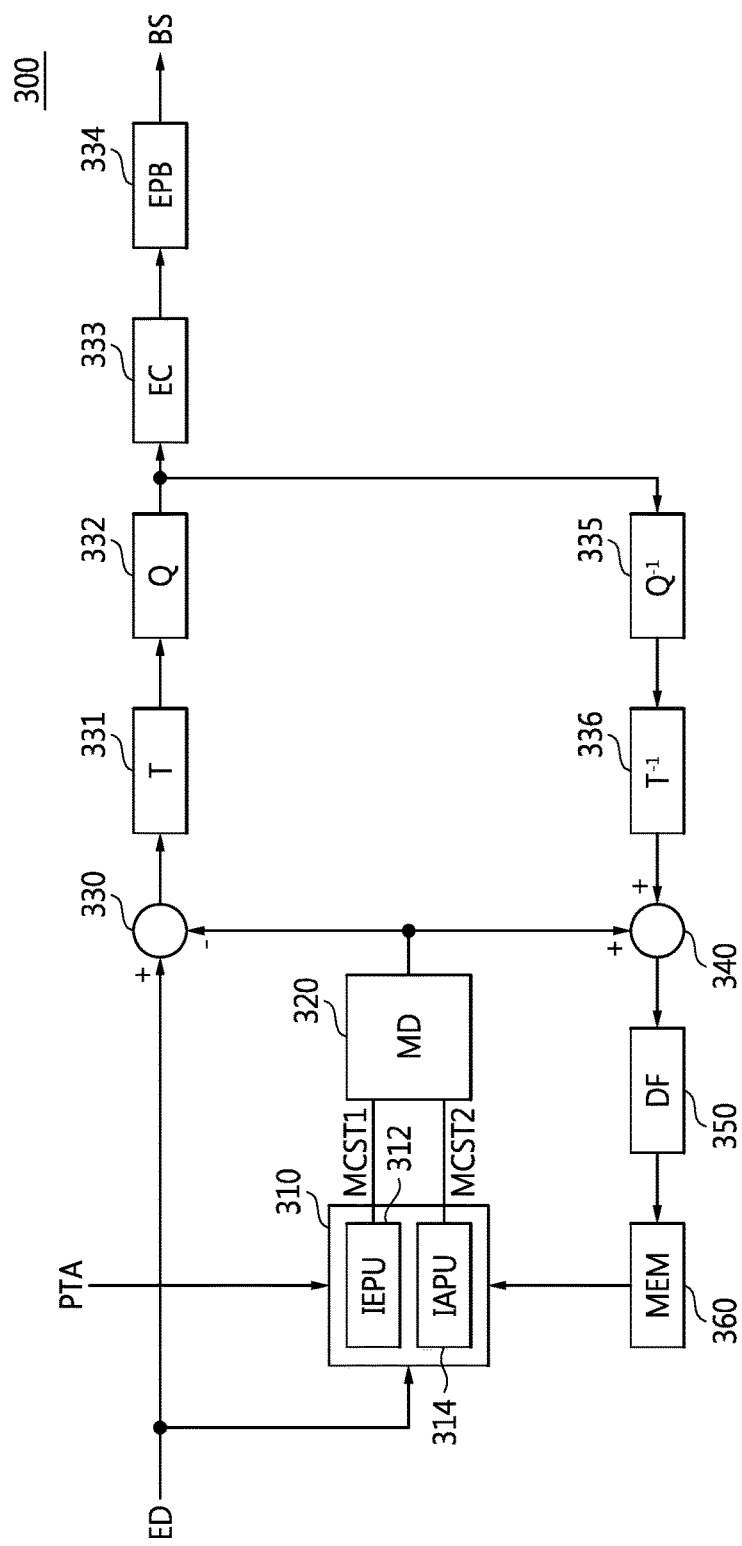
FIG. 3 is a detailed block diagram of an encoding module illustrated in FIG. 2, according to an example embodiment.

FIG. 3 is a detailed block diagram of an encoding module illustrated in FIG. 2, according to an example embodiment. Referring to FIGS. 1 through 3, in one example embodiment, the encoding module 300 receives the encoding data ED in units of macroblocks in each field image. The encoding module 300 performs intra prediction and inter prediction, decides an encoding mode for each macroblock of the encoding data ED, and encodes the macroblock according to the encoding mode. The encoding module 300 may include a prediction block 310, a mode decision (MD) block 320, a subtractor 330, a transform block T or 331, a quantization block Q or 332, an entropy coder (EC) 333, an encoded picture buffer (EPB) 334, an inverse quantization block Q-1 or 335, an inverse transform block T-1 or 336, an adder 340, a deblocking filter (DF) 350, and a reference image memory MEM or 360. While example embodiments below are described as being performed by individual components of the encoding module 300, in one example embodiment the CPU 110 may execute computer-readable instructions to perform the functionalities of the individual components of the encoding module 300.

In one example embodiment, the prediction block 310 includes an inter prediction unit IEPU 312 that performs inter prediction on the encoding data ED received in units of macroblocks and an intra prediction unit IAPU 314 that performs intra prediction on the encoding data ED. The prediction block 310 performs intra prediction and/or inter prediction according to an image type such as an I-image or a P-image determined by the image type assignment signal PTA.

In one example embodiment, when the image type assignment signal PTA indicates that the field image is an I-image, the inter prediction unit 312 receives all macroblocks of the I-image and performs intra prediction based on the I-image. When the image type assignment signal PTA indicates that the field image is a P-image, the inter prediction unit 312 performs inter prediction using a reference image, i.e., a preceding image that has been encoded and decoded right before a current image (i.e., an I-image or a P-image belonging to one image group) and the intra prediction unit 314 performs intra prediction based on the I-image. When the image type assignment signal PTA indicates that the field image is a B-image, the inter prediction unit 312 performs inter prediction using a reference frame, i.e., a preceding image that has been encoded and decoded (i.e., an I-image and a P-image belonging to one image group) and the intra prediction unit 314 performs intra prediction based on the I-image.

According to the H.264 standard, available coding modes for a macroblock are an inter mode and an intra mode. The inter mode includes five motion compensation modes, i.e., skip mode, 16*16 mode, 8*16 mode, 16*8 mode, and 8*8 mode. The 8*8 motion compensation mode includes three sub-modes, i.e., 8*4 mode, 4*8 mode, and 4*4 mode for an 8*8 sub-block. The intra mode includes four 16*16 intra prediction modes and nine 4*4 intra prediction modes.

In order to encode a macroblock in one of the available coding modes, the prediction block 310 may perform rate-distortion optimization which is described below.

In one example embodiment, the intra prediction unit 314 obtains, among the above-described intra modes, an intra mode giving a minimum intra rate-distortion cost Jmd defined as Equation 1:

$$Jmd = DISTmd + Kmd*Rmd, \qquad (1)$$

where Kmd is a Lagrangian coefficient for mode decision, Rmd is the number of bits required to perform encoding in a candidate intra mode, and DISTmd is distortion of the difference between a pixel in a reconstructed macroblock provided from the reference image memory 360 and a pixel in an input macroblock of the field image. A sum of absolute differences (SAD), a sum of absolute transformed differences (SATD), or a sum of squared differences (SSD) may be used as a distortion function. In one example embodiment, as described above, the intra prediction unit 314 determines (e.g., calculates) intra rate-distortion costs Jmd in respective intra modes and determines, as a minimum intra rate-distortion cost MCST2, information about an intra rate-distortion cost Jmd which is minimum among the intra rate-distortion costs Jmd and about a macroblock corresponding to the intra rate-distortion cost Jmd which is minimum.

The inter prediction unit 312 obtains an optimal motion vector for each inter mode except for the skip mode. The optimal motion vector is a motion vector allowing an inter rate-distortion cost Jmt defined as Equation 2 among candidate motion vectors to be minimum $$Jmt = DISTmt + Kmt*Rmt, \qquad (2)$$

where Kmt is a Lagrangian coefficient for motion estimation; Rmt is the number of bits required to encode data using a candidate mode, a candidate reference image, and a candidate motion vector; and DISTmt is distortion of the difference between a pixel in a motion-compensated macroblock generated using the candidate motion vector and a pixel in an input macroblock. The SAD, SAM, or SSD may be used as a distortion function.

In one example embodiment, a type of a candidate motion vector is determined depending on the size of a search window. When the encoding module 300 uses a plurality of reference images, the operation for the optimal motion estimation is repeated with respect to each of the reference images. As described above, the inter prediction unit 312 determines (e.g., calculates) inter rate-distortion costs Jmt with respect to respective reference images, respective candidate motion vectors, and respective inter modes; and determines, as a minimum inter rate-distortion cost MCST1, information about an inter rate-distortion cost Jmt which is minimum among the inter rate-distortion costs Jmt and about a macroblock corresponding to the inter rate-distortion cost Jmt which is minimum.

In one example embodiment and in the skip mode, the inter prediction unit 312 does not obtain an optimal motion vector but determines, as the minimum inter rate-distortion cost MCST1, information about an inter rate-distortion cost Jmt of a macroblock at the same position as the input macroblock in a reference image and about the macroblock in the reference image.

In one example embodiment, the mode decision block 320 compares the minimum intra rate-distortion cost MCST2 with the minimum inter rate-distortion cost MCST1 and determines an encoding mode corresponding to the smaller one between the costs MCST2 and MCST1. The mode decision block 320 may provide information, such as a reference block and a motion vector which corresponds to the encoding mode, for the subtractor 330 and the adder 340. The reference block refers to information about a macroblock corresponding to the smaller one between the costs MCST2 and MCST1.

In one example embodiment, the subtractor 330 subtracts the reference block received from the mode decision block 320 from the input macroblock, thereby generating a residual block. The transform block 331 performs spatial transform on the residual block generated by the subtractor 330. The spatial transform may be discrete cosine transform (DCT) or wavelet transform. A transform coefficient is obtained as a result of the spatial transform. When DCT is used as the spatial transform, a DCT coefficient is obtained. When wavelet transform is used as the spatial transform, a wavelet coefficient is obtained.

In one example embodiment, the quantization block 332 quantizes the transform coefficient obtained by the transform block 331. Quantization is an operation of classifying the transform coefficient expressed as a random value into a certain range and expressing the transform coefficient as a discrete value. Quantization may include scalar quantization and vector quantization. Simple scalar quantization is the process of dividing the transform coefficient by a corresponding value in a quantization table and rounding the division result to the nearest integer value.

In one example embodiment, the entropy coder 333 performs lossless encoding on the quantized data output from the quantization block 332 and information such as intra prediction mode, reference frame number, and motion vector, thereby generating the bitstream BS. The lossless encoding may be arithmetic coding like context-adaptive binary arithmetic coding (CABAC) or variable length coding like context-adaptive variable-length coding (CAVLC). The bitstream BS may be buffered by the EPB 334 and then output. The bitstream BS may be stored in a memory (e.g., the RAM 130 or the memory 175) outside the encoder 200a.

In one example embodiment, the inverse quantization block 335, the inverse transform block 336, and the adder 340 decode the lossless-encoded data in reverse way and the decoding result is used to generate a reconstructed picture. The inverse quantization block 335 inverse-quantizes the quantized data received from the quantization block 332. The inverse quantization is a procedure reverse to the quantization. The inverse transform block 336 performs inverse spatial transform on the inverse-quantization result and sends the result of the inverse spatial transform to the adder 340.

In one example embodiment, the adder 340 adds a signal from the inverse transform block 336 and the reference block from the mode decision block 320 to restore the input macroblock. The macroblock restored by the adder 340 is provided for the DF 350 and an image of an adjacent block in the reconstructed picture is provided for the intra prediction unit 314. The DF 350 performs deblock filtering with respect to a border of each macroblock. The deblock-filtered data is stored in the reference image memory 360 and is used as a reference image.

Consequently, the encoding module 300 encodes a top field, which is assigned to an I-image and is included in each of the first through n-th frames, in the intra mode and encodes a bottom field, which is assigned to a P-image and is included in each of the first through n-th frames, in both the inter mode and the intra mode.

Figure 4:
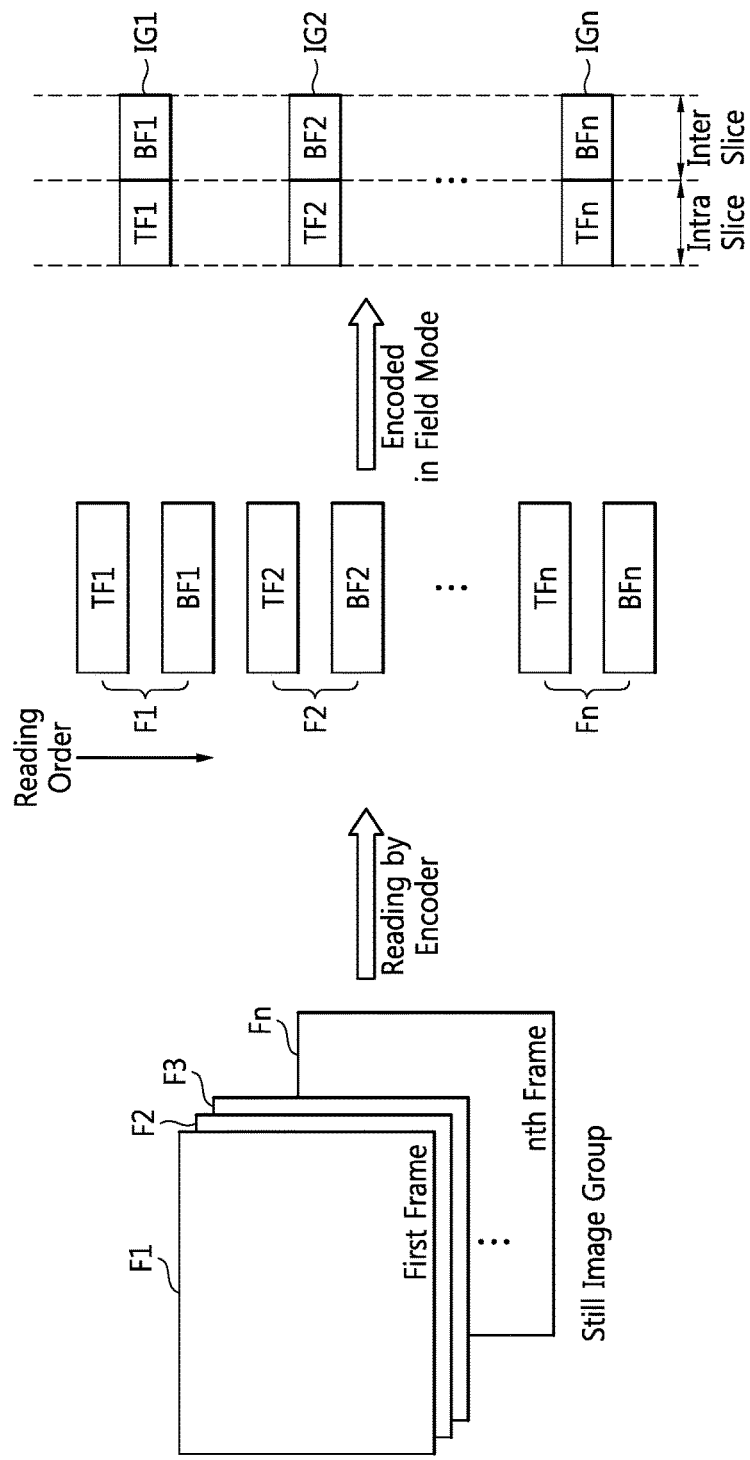
FIG. 4 is a diagram for explaining a procedure in which a still image group is read and encoded by the encoder illustrated in FIG. 2, according to an example embodiment.

FIG. 4 is a diagram for explaining a procedure in which a still image group is read and encoded by an encoder illustrated in FIG. 2, according to an example embodiment. Referring to FIGS. 1 through 4, the still image group including first through n-th frames F1 through Fn is generated in the burst shot mode. The still image group may be temporarily stored in the RAM 130 and transmitted to the codec 140 according to the control of the CPU 110.

The source read unit 250 may read the image data ID in the field mode determined by the mode selection signal MS. Each of the first through n-th frames F1 through Fn may include a plurality of pixels arranged in a matrix form having A rows and B columns, where A and B are an integer of at least 1.

The source read unit 250 reads a first top field TF1 corresponding to odd-numbered rows in the first frame F1 and then reads a first bottom field BF1 corresponding to even-numbered rows in the first frame F1. In the same manner, the source read unit 250 reads a top field TF2 first and then reads a bottom field BF2 with respect to the second frame F2 and reads a top field TFn first and then reads a bottom field BFn with respect to the n-th frame Fn.

The image type determination block 270 sequentially assign the fields TF1 through TFn and BF1 through BFn of the image data ID to first through n-th image groups IG1 through IGn, respectively. In other words, the top fields TF1 through TFn in the respective first through n-th image groups IG1 through IGn are assigned to an I-image corresponding to an intra slice and the bottom fields BF1 through BFn in the respective first through n-th image groups IG1 through IGn are assigned to a P-image corresponding to an inter slice.

The encoding module 300 may encode the top fields TF1 through TFn in the respective first through n-th image groups IG1 through IGn as an I-image and then encode the bottom fields BF1 through BFn in the respective first through n-th image groups IG1 through IGn as a P-image based on the top fields TF1 through TFn that have been encoded as the I-image. For instance, the encoding module 300 may encode the top field TF1 in the first image group IG1 as an I-image and then encode the bottom field BF1 in the first image group IG1 as a P-image based on the top field TF1 that has been encoded. Thereafter, the encoding module 300 may encode the top field TF2 in the second image group IG2 as an I-image and then encode the bottom field BF2 in the second image group IG2 as a P-image based on the top field TF2 that has been encoded. In such manner, the encoding module 300 may sequentially perform encoding up to the n-th image group IGn.

Since the first through n-th frames F1 through Fn respectively correspond to the first through n-th image groups IG1 through IGn and each of the image groups IG1 through IGn is divided into top and bottom fields and encoded using the IP method, a compression rate increases as compared when the first through n-th frames F1 through Fn are encoded in the intra mode. In addition, when a user wants to display a particular frame, the CPU 110 can transmit only one image group corresponding to the particular frame among the first through n-th image groups IG1 through IGn stored in the RAM 130 to the decoder 400. The decoder 400 can decode the particular frame based on only one image group. In other words, when one frame is decoded at the user's request, the frame can be decoded without other frames being referred to since an image group corresponding to each frame is independently encoded and stored in the RAM 130 using the IP method. Consequently, random access is possible when encoded frames are decoded.

Figure 5:
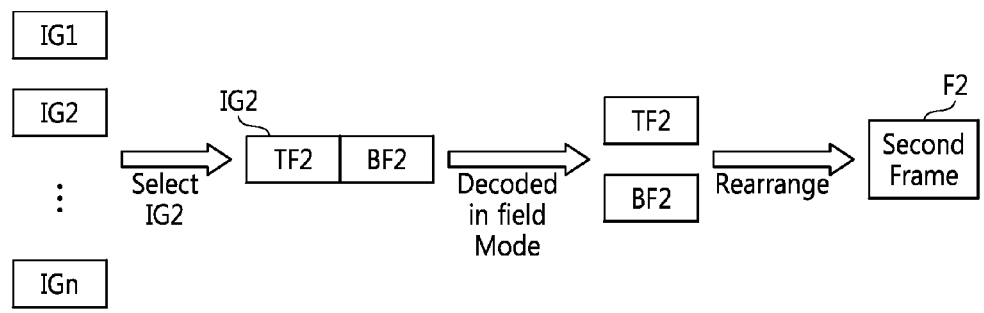
FIG. 5 is a diagram for explaining decoding performed by a decoder illustrated in FIG. 1, according to an example embodiment.

FIG. 5 is a diagram for explaining decoding performed by a decoder illustrated in FIG. 1, according to an example embodiment. In detail, FIG. 5 is a diagram for explaining a procedure for selecting and decoding the second image group IG2 among the first through n-th image groups IG1 through IGn that have been encoded in the encoding procedure illustrated in FIG. 4.

Referring to FIGS. 1 through 5, when a particular frame (e.g., the second frame F2) is to be displayed at a user's request, the CPU 110 may read and transmit only the second image group IG2 corresponding to the second frame F2 from the RAM 130 to the decoder 400. The decoder 400 may decode the top field TF2 in the second image group IG2 in the intra mode and the bottom field BF2 in the second image group IG2 in the inter mode according to the field mode. In addition, the decoder 400 may restore the second frame F2 by rearranging the decoded data. In detail, the decoder 400 may alternately read the rows of the top field TF2 and the rows of the bottom field BF2 so that the rows of the top field TF2 become odd-numbered rows in the second frame F2 and the rows of the bottom field BF2 become even-numbered rows in the second frame F2, thereby restoring the second frame F2.

Figure 6:
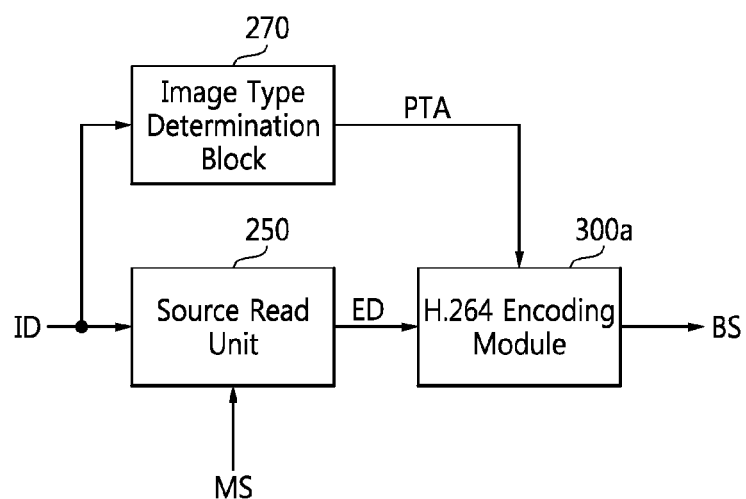
FIG. 6 is a block diagram of an encoder illustrated in FIG. 1, according to an example embodiment.

FIG. 6 is a block diagram of an encoder illustrated in FIG. 1, according to an example embodiment. The structure and operations of an encoder 200b are similar to those of the encoder 200a illustrated in FIG. 2. Thus, the description will be focused on the differences between the encoders 200b and 200a to avoid redundancy.

Referring to FIGS. 1, 2, and 6, the encoder 200b may include the source read unit 250, the image type determination block 270, and an H.264 encoding module 300a. The H.264 encoding module 300a is an encoding module complying with the H.264 standard. The structure and operations of the H.264 encoding module 300a may be the same as those of the encoding module 300 illustrated in FIG. 3. While example embodiments below are described as being performed by individual components of the encoding module 300a, in one example embodiment the CPU 110 may execute computer-readable instructions to perform the functionalities of the individual components of the encoding module 300a.

Figure 7:
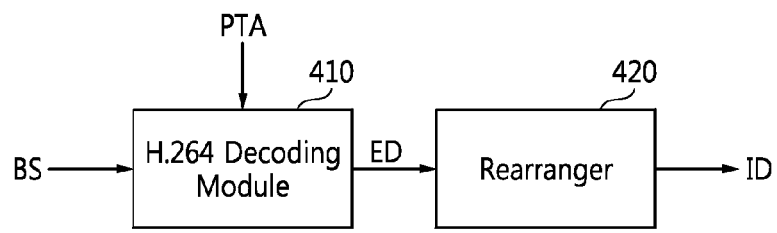
FIG. 7 is a block diagram of a decoder illustrated in FIG. 1, according to an example embodiment.

FIG. 7 is a block diagram of a decoder illustrated in FIG. 1, according to an example embodiment. A decoder 400 may include an H.264 decoding module 410 and a rearranger 420. While example embodiments below are described as being performed by individual components of the decoder 400, in one example embodiment the CPU 110 may execute computer-readable instructions to perform the functionalities of the individual components of the decoder 400.

The H.264 decoding module 410 may receive and decode the bitstream BS to output the encoding data ED. The bitstream BS may have been output from the H.264 encoding module 300*a* and stored in a memory and then input to the H.264 decoding module 410. The H.264 decoding module 410 may perform an inverse operation of the operation performed by the encoding module 300 illustrated in FIG. 3 to restore the encoding data ED from the bitstream BS. The rearranger 420 may rearrange the encoding data ED to restore the image data ID.

The rearranger 420 may rearrange the rows of each of the top fields TF1 through TFn and the rows of each of the bottom fields BF1 through BFn by alternately reading the rows of each top field and the rows of each bottom field, so that the rows of each of the top fields TF1 through TFn become odd-numbered rows in a corresponding one of the first through n-th frames F1 through Fn and the rows of the each of the bottom fields BF1 through BFn become even-numbered rows in the corresponding frame, thereby restoring each of the first through n-th frames F1 through Fn in the image data ID.

Figure 8:
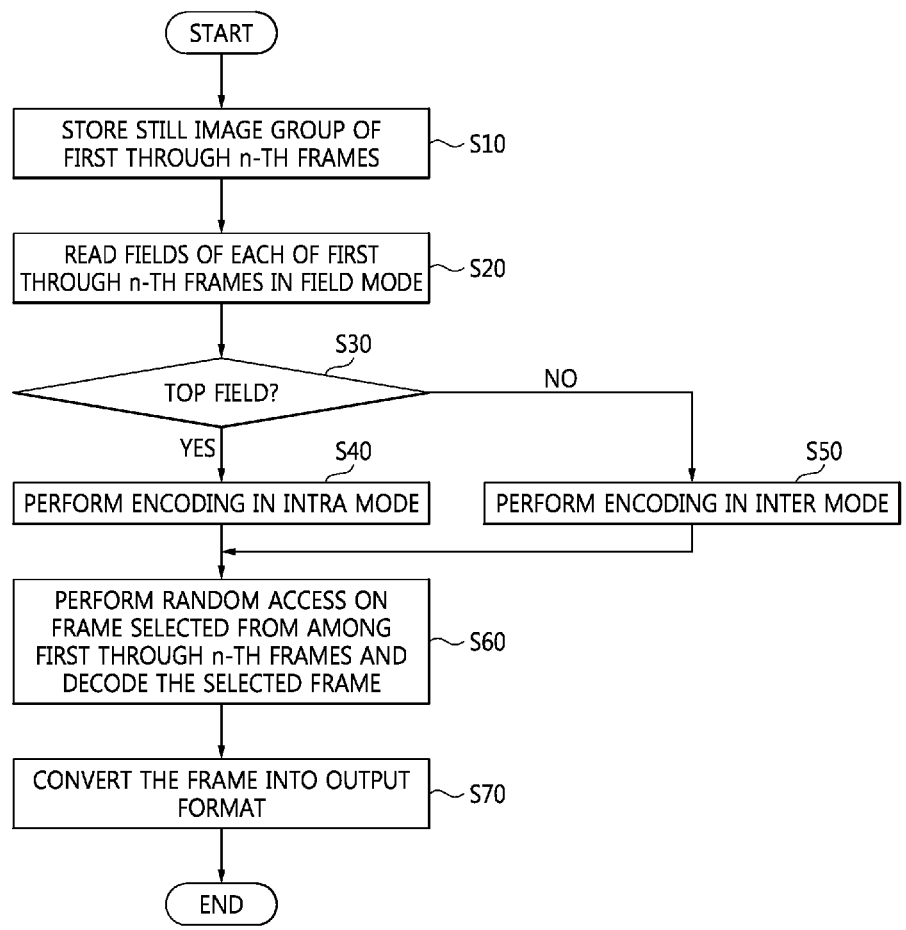
FIG. 8 is a flowchart of a method of operating an application processor illustrated in FIG. 1, according to an example embodiment.

FIG. 8 is a flowchart of a method of operating the application processor illustrated in FIG. 1, according to an example embodiment. While each step of the method in FIG. 8 is described as being performed by individual components of the application processor 100, in one example embodiment the CPU 110 may execute computer-readable instructions to perform the functionalities of the individual components of the application processor 100.

Referring to FIGS. 1 through 8, the RAM 130 stores the still image group (i.e., the first through n-th frames F1 through Fn) generated in the burst shot mode selected by a user in operation S10. The source read unit 250 may read the first through n-th frames F1 through Fn in the field mode determined by the mode selection signal MS so that the first through n-th frames F1 through Fn are divided into the top fields TF1 through TFn and the bottom fields BF1 through BFn in operation S20.

When the field image of the encoding data ED correspond to the top fields TF1 through TFn (in case of YES) in operation S30, the encoding module 300 encodes the top fields TF1 through TFn in the intra mode in operation S40. When the field image of the encoding data ED correspond to the bottom fields BF1 through BFn (in case of NO) in operation S30, the encoding module 300 encodes the bottom fields BF1 through BFn in the inter mode in operation S50.

The field images of each of the first through n-th frames F1 through Fn which have been encoded may be stored in the RAM 130 according to the control of the CPU 110. When a particular frame is to be output to the display device 165 in response to the user's choice, the CPU 110 may transmit only one group corresponding to the particular frame among the first through n-th image groups IG1 through IGn from the RAM 130 to the decoder 400. The decoder 400 may decode the particular frame based on the only one group corresponding to the particular frame in operation S60.

The codec 140 may convert the decoded frame into a particular format (e.g., a JPEG format) required by the display device 165 in operation S70.

According to one or more example embodiments of the inventive concepts, the application processor 100 generates data which has a high compression rate and allows random access to each frame when a still image group is encoded. In addition, when the application processor 100 is used, performance of processing a still image group is improved even if an encoder and a decoder which support the existing H.264 standard are used.

Figure 9:
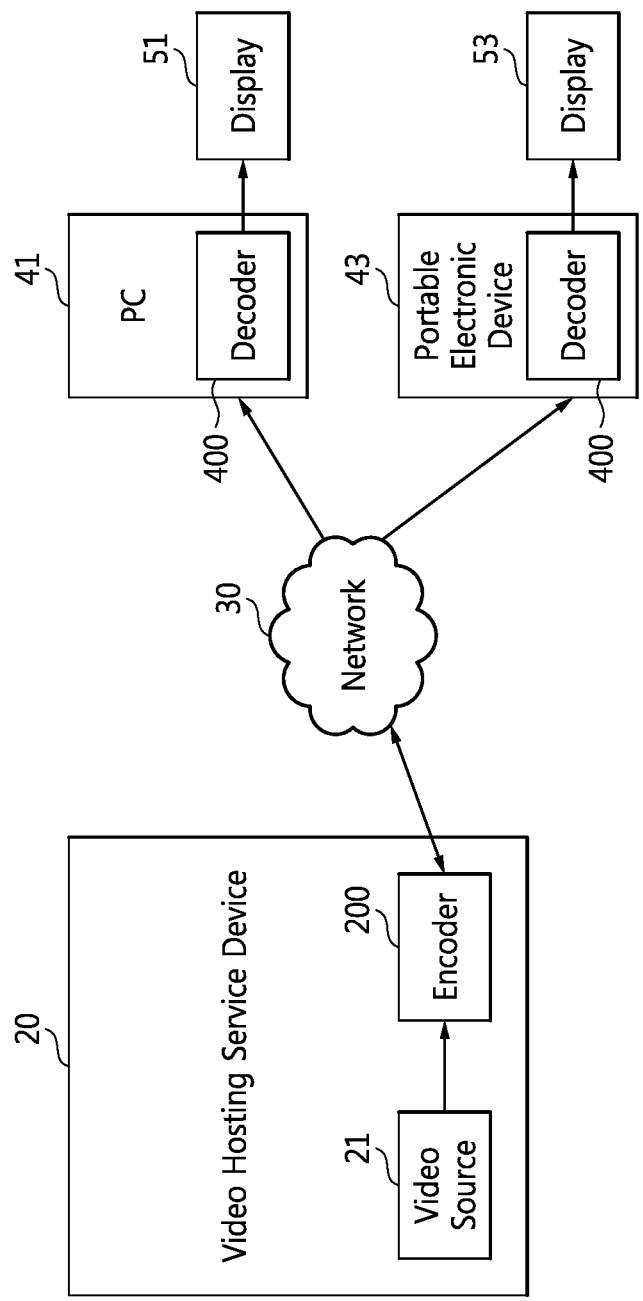
FIG. 9 is a block diagram of a data processing system, according to an example embodiment.

FIG. 9 is a block diagram of a data processing system, according to an example embodiment. Referring to FIG. 9, the data processing system includes a video hosting service device 20, a first device 41, and a second device 43.

The first device 41 may be implemented as a PC and the second device 43 may be implemented as a portable electronic device. The devices 20, 41, and 43 may communicate with one another through a network 30. The architecture of the network 30 may be modified in various ways. The network 30 may be implemented as a wired internet, a wireless internet, or a mobile cellular network.

The video hosting service device 20 includes a video source 21 and the encoder 200. The encoder 200 receives source image data from the video source 21. The encoder 200 encodes the source image data to generate an encoded bitstream. The encoder 200 may be the encoder 200, 200*a*, or 200*b* illustrated in FIG. 1, 2, or 6. The encoded bitstream may be transmitted to the first device 41 and the second device 43 through the network 30.

The encoded bitstream transmitted to the network 30 may be transmitted to the first device 41 and/or the second device 43. Each of the devices 41 and 43 may be a PC, a cellular phone, a smartphone, a tablet PC, a laptop computer, a PDA, an EDA, a portable multimedia player (PMP), a personal navigation device or portable navigation device (PND), a handheld game console, a MID, or an e-book.

The first device 41 includes the decoder 400 and a display 51 and the second device 43 includes the decoder 400 and a display 53. The decoder 400 may be the decoder 400 illustrated in FIG. 1 or 7. Each decoder 400 may decode the encoded bitstream received through the network 300 and may output the decoded data to the corresponding display 51 or 53.

Figure 10:
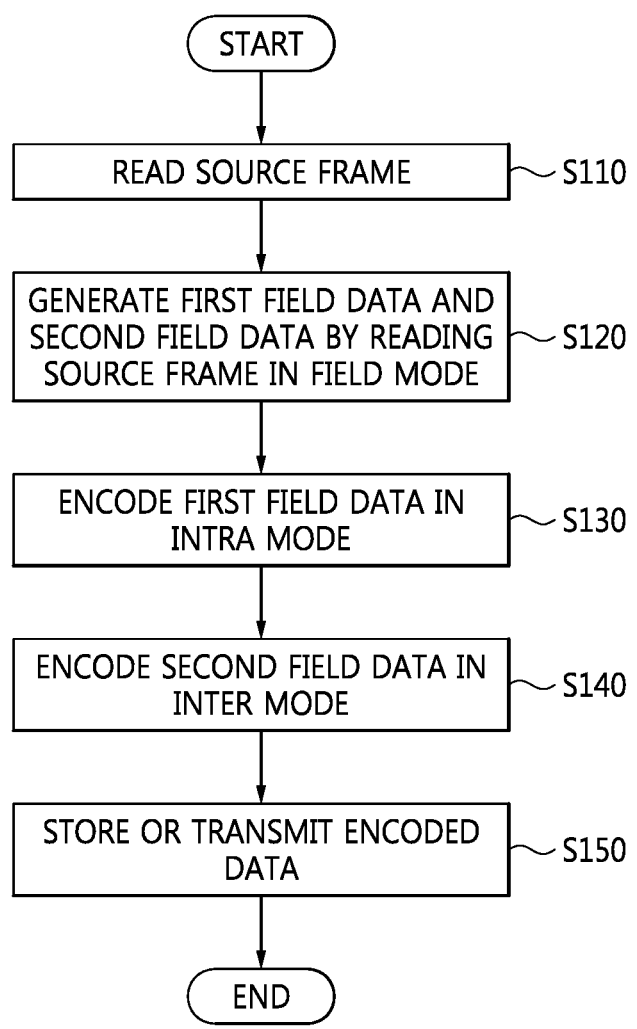
FIG. 10 is a flowchart of a data encoding method, according to an example embodiment.

FIG. 10 is a flowchart of a data encoding method, according to an example embodiment. The data encoding method illustrated in FIG. 10 may be performed by the encoder 200, 200*a*, or 200*b* illustrated in FIG. 1, 2, 6, or 9 (alternatively by the CPU 110 implementing the functionalities of the encoders shown in FIG. 1, 2, 6 or 9 by executing a set of computer readable instructions, as described above).

Referring to FIG. 10, the encoder 200, 200*a*, or 200*b* reads a source frame in operation S110 received at the encoder 200, 200*a*, or 200*b*. The source frame is image data corresponding to a single frame. The source frame may be a frame in a still image group (including the first through n-th frames F1 through Fn) generated in the burst shot mode selected by a user or a frame in source image data output from the video source 21.

The encoder 200, 200*a*, or 200*b* reads the source frame in the field mode to generate first field data and second field data in operation S120. The first field data may correspond to each of the top fields TF1 through TFn and the second field data may correspond to each of the bottom fields BF1 through BFn.

The encoder 200, 200*a*, or 200*b* encodes the first field data in the intra mode in operation S130 and encodes the second field data in the inter mode in operation S140. The encoder 200, 200*a*, or 200*b* may store the encoded data, i.e., the encoded bitstream BS in a memory or transmit it to another device in operation S150.

Figure 11:
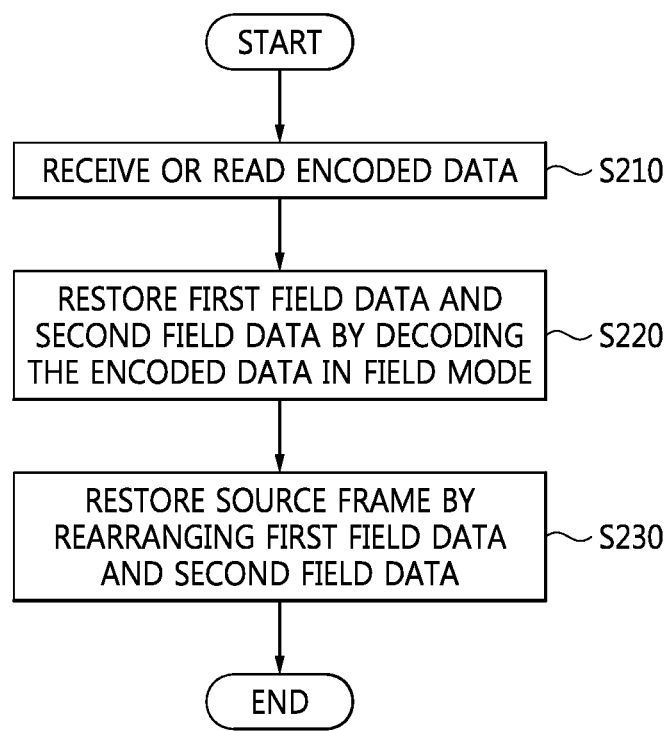
FIG. 11 is a flowchart of a data decoding method, according to an example embodiment.

FIG. 11 is a flowchart of a data decoding method according to an example embodiment. The data decoding method illustrated in FIG. 11 may be performed by the decoder 400 illustrated in FIG. 1, 7, or 9 (alternatively by the CPU 110 implementing the functionalities of the decoders shown in FIG. 1, 7 or 9 by executing a set of computer readable instructions, as described above).

Referring to FIG. 11, the decoder 400 may read encoded data, i.e., the encoded bitstream BS from a memory or may receive it from another device in operation S210. The decoder 400 restore first field data and second field data by decoding the encoded data in the field mode in operation S220. For instance, the decoder 400 may decode the encoded data in the intra mode to restore the first field data and may decode the encoded data in the inter mode to restore the second field data.

The decoder 400 restores a source frame by rearranging the first field data and the second field data in operation S230. For instance, the decoder 400 may rearrange the first field data and the second field data by alternately reading the rows in the first field data and the rows in the second field data so that the rows in the first field data become odd-numbered rows in the source frame and the rows in the second field data become even-numbered rows in the source frame, thereby restoring the source frame.

Figure 12:
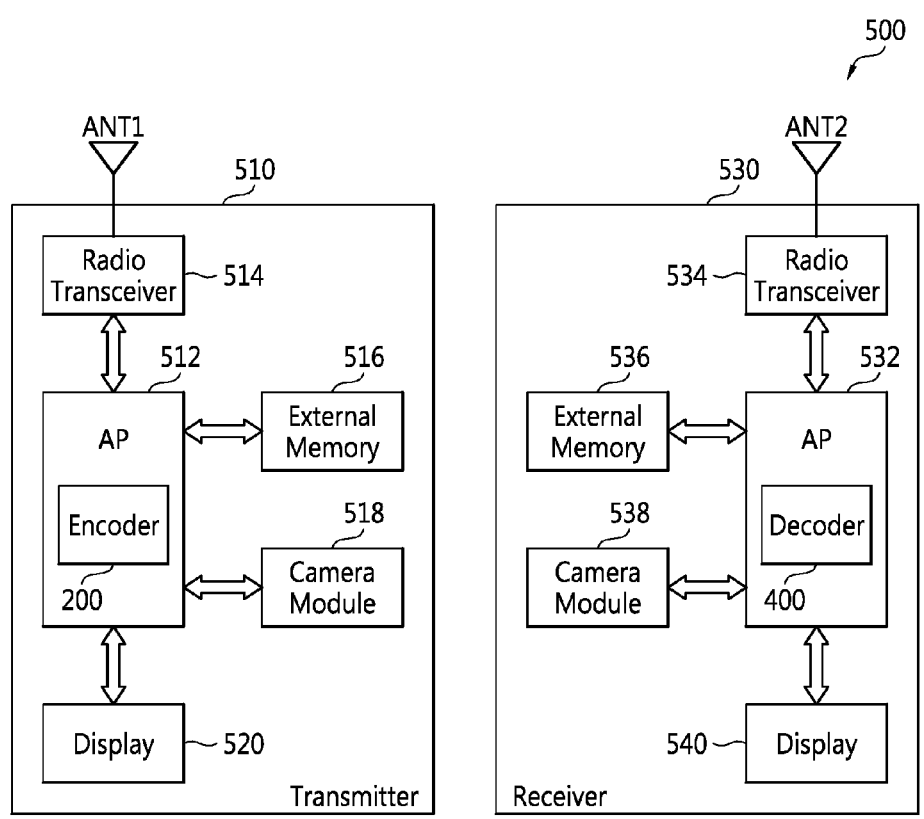
FIG. 12 is a block diagram of a data processing system, according to an example embodiment t.

FIG. 12 is a block diagram of a data processing system, according to an example embodiment. Referring to FIG. 12, a data processing system 500 includes a transmitter 510 and a receiver 530. The transmitter 510 and the receiver 530 each may be a cellular phone, a smartphone, or a tablet PC.

The transmitter 510 includes an application processor (AP) 512, a display 520, a camera module 518, an external memory 516, and a radio transceiver 514. The operations and functions of the AP 512, the display 520, the camera module 518, and the external memory 516 are similar to those of the AP 100, the display 165, the camera 155, and the memory 175 illustrated in FIG. 1, and therefore, the detailed descriptions thereof will be omitted.

The AP 512 includes the encoder 200. The radio transceiver 514 may transmit an encoded bitstream to the receiver 530 through an antenna ANT1. The transmitter 510 may also operate as a receiver.

The receiver 530 includes an AP 532, a display 540, a camera module 538, an external memory 536, and a radio transceiver 534. The operations and functions of the AP 532, the display 540, the camera module 538, and the external memory 536 are similar to those of the AP 100, the display 165, the camera 155, and the memory 175 illustrated in FIG. 1, and therefore, the detailed descriptions thereof will be omitted.

The AP 532 includes the decoder 400. The radio transceiver 534 may receive the encoded bitstream from the transmitter 510 through an antenna ANT2. The receiver 530 may also operate as a transmitter.

The decoder 400 may decode the encoded bitstream and may output decoded image data to the display 540, so that the image data is displayed on the display 540.

As described above, according to one or more example embodiments of the inventive concepts, an application processor generates data which has a high compression rate and allows random access to a frame when a still image group is encoded.

While the inventive concepts have been particularly shown and described with reference to example embodiments thereof, it will be understood by those of ordinary skill in the art that various changes in forms and details may be made therein without departing from the spirit and scope of the inventive concepts as defined by the following claims.

What is claimed is:

1. A multimedia codec comprising:
a reader configured to,
read a first frame in an image group including at least two frames of a continuously shot single scene according to a field mode indicated by a mode selection signal, and
produce a top field and a bottom field for the first frame;
an encoding component configured to encode the top field in an intra mode and encode the bottom field in an inter mode; and
a decoding component configured to decode the first frame, the first frame being selected by a user from among the at least two frames,
wherein the at least two frames of the image group are continuous frames generated in a burst shot mode.

2. The multimedia codec of claim 1,
wherein the decoding component is configured to decode the first frame by,
decoding the top field in the intra mode, and
decoding the bottom field in the inter mode.

3. The multimedia codec of claim 2, wherein
the encoding component is configured to encode a plurality of frames of the image group, the plurality of frames including the first frame, and
the decoding component is configured to decode one of the plurality of encoded frames, the one of the plurality of encoded frames corresponding to a frame of the image group selected to be displayed.

4. The multimedia codec of claim 3, wherein
the encoding component is an H.264 encoder, and
the decoding component is an H.264 decoder.

5. The multimedia codec of claim 1, wherein an encoder comprising the reader and the encoding component operates in one of the field mode and a frame mode according to the mode selection signal.

6. An application processor comprising:
a memory configured to store an image group of a continuously shot single scene, the image group including at least two frames;
a central processing unit (CPU) configured to generate a mode selection signal for determining an encoding mode in which the image group is to be encoded; and
a multimedia codec configured to encode the image group according to a field mode indicated by the generated mode selection signal, the multimedia codec including,
a reader configured to read each of the at least two frames according to the field mode to produce a top field and a bottom field,
an encoding component configured to encode the top field in an intra mode and encode the bottom field in an inter mode, and
a decoding component configured to decode a frame selected by a user from among the at least two frames,
wherein the at least two frames of the image group are continuous frames generated in a burst shot mode.

7. The application processor of claim 6, wherein the decoding component is configured to decode the selected frame by decoding the top field of the selected frame according to the intra mode and the bottom field of the selected frame according to the inter mode.

8. The application processor of claim 7, wherein an encoder including the reader and the encoding component is an H.264 encoder and the decoder is an H.264 decoder.

9. The application processor of claim 6, wherein the encoding mode comprises the field mode and a frame mode.

10. A device comprising:
a memory having computer-readable instructions stored therein; and
a processor configured to execute the computer-readable instructions to,
- partition at least one selected image frame selected from at least two frames of a continuously shot single scene into a first group and a second group, upon receiving a mode selection signal,
- encode the first group according to an intra mode of encoding,
- encode the second group according an inter mode of encoding, and
- decode a frame selected by a user from among the at least two frames,
- wherein the at least two frames are continuous frames generated in a burst shot mode.

11. The device of claim 10, wherein
the mode selection signal is a field mode selection signal, and
the processor is configured to execute the computer readable instructions to read the selected image frame according to the field mode selection signal in order to partition the selected image frame into the first group and the second group.

12. The device of claim 10, wherein
the first group is a top field including pixels corresponding to odd-numbered rows of the selected image frame, and
the second group is a bottom field including pixels corresponding to even-numbered rows of the selected image frame.

13. The device of claim 10, wherein the processor is further configured to execute the computer-readable instructions to select the intra mode of encoding from among a plurality of intra encoding schemes.

14. The device of claim 13, wherein the processor is further configured to execute the computer-readable instructions to,
- determine a cost function associated with each of the plurality of intra encoding schemes, and
- select as the intra mode of encoding, one of the plurality of intra encoding schemes with a lowest cost function among the determined cost functions.

15. The device of claim 10, wherein the process is further configured to execute the computer-readable instructions to select the inter mode of encoding from among a plurality of inter encoding schemes.

16. The device of claim 15, wherein the processor is further configured to execute the computer-readable instructions to,
- determine a cost function associated with each of the plurality of inter encoding schemes, and
- select as the inter mode of encoding, one of the plurality of inter encoding schemes with a lowest cost function among the determined cost functions.

17. The device of claim 10, wherein the processor is further configured to execute the computer-readable instructions to,
- receive a request for displaying one of the at least two frames,
- decode the requested one of the at least two frames by,
- decoding the encoded first group of the requested one of the at least two frames according to an intra mode of decoding, the intra mode of decoding corresponding to the intra mode of encoding, and
- decoding the encoded second group of the requested one of the at least two frames according to an inter mode of decoding, the inter mode of decoding corresponding to the inter mode of encoding.

* * * * *